US012755036B2

(12) United States Patent
Honya et al.

(10) Patent No.: US 12,755,036 B2
(45) Date of Patent: Oct. 6, 2026

(54) ACCESS AUTHORIZATION SYSTEM, ELECTRONIC CONTROL DEVICE, ACCESS AUTHORIZATION METHOD, AND STORAGE MEDIUM STORING PROGRAM

(71) Applicant: DENSO CORPORATION, Kariya-city (JP)

(72) Inventors: Hideyuki Honya, Kariya-city (JP); Hideyuki Yamaguchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 56 days.

(21) Appl. No.: 18/898,128

(22) Filed: Sep. 26, 2024

(65) Prior Publication Data

US 2025/0021675 A1 Jan. 16, 2025

Related U.S. Application Data

(63) Continuation of application No. PCT/JP2023/012272, filed on Mar. 27, 2023.

(30) Foreign Application Priority Data

Mar. 31, 2022 (JP) ................................ 2022-059062

(51) Int. Cl.
*G06F 21/62* (2013.01)
*G06F 21/31* (2013.01)
(Continued)

(52) U.S. Cl.
CPC .............. *G06F 21/62* (2013.01); *G06F 21/31* (2013.01); *G06F 21/6218* (2013.01); *H04L 9/32* (2013.01); *H04L 63/10* (2013.01); *G06F 21/6209* (2013.01)

(58) Field of Classification Search
CPC .. G06F 21/62; G06F 21/6218; G06F 21/6209; G06F 21/31; H04L 9/32; H04L 63/10; H04L 63/101; H04L 63/105
See application file for complete search history.

(56) References Cited

U.S. PATENT DOCUMENTS 7,610,602 B2 * 10/2009 Ficco ................ H04N 7/17336 725/77
11,696,126 B2 * 7/2023 Chun .................... H04W 12/08 701/36

(Continued)

FOREIGN PATENT DOCUMENTS

JP 4776627 B2 9/2011
JP 6061687 B2 1/2017

(Continued)

*Primary Examiner* — Shaqueal D Wade-Wright
(74) *Attorney, Agent, or Firm* — Harness, Dickey & Pierce, P.L.C.

(57) ABSTRACT

An access authorization system authorizes access to privacy information based on an authentication result of a user of a vehicle. Authentication of the user is performed based on the authentication result obtained by a different authentication method. The access authorization system includes a management section configured to manage, for each seat of the vehicle, management data indicating which user has been authenticated by which authentication method, and a determination section configured to determine, for access to the privacy information of the user, which user associated with each of the seats is required to make agreement based on the management data.

9 Claims, 12 Drawing Sheets

(51) Int. Cl.
*H04L 9/32* (2006.01)
*H04L 9/40* (2022.01)

(56) References Cited

U.S. PATENT DOCUMENTS

| | | | | |
|---|---|---|---|---|
| 2009/0105910 | A1* | 4/2009 | Scully | B60N 2/4279 701/49 |
| 2009/0138920 | A1* | 5/2009 | Anandpura | H04N 21/2146 725/76 |
| 2015/0363986 | A1 | 12/2015 | Hoyos et al. | |
| 2017/0174180 | A1 | 6/2017 | Hoyos et al. | |
| 2018/0009417 | A1 | 1/2018 | Hoyos et al. | |
| 2019/0054899 | A1 | 2/2019 | Hoyos et al. | |
| 2020/0380148 | A1* | 12/2020 | Hoffen | G06F 21/6245 |
| 2022/0063402 | A1* | 3/2022 | Veluppillai | G06F 13/36 |

FOREIGN PATENT DOCUMENTS

| | | | |
|---|---|---|---|
| JP | 6800054 | B2 | 12/2020 |
| JP | 6827918 | B2 | 2/2021 |

* cited by examiner

FIG. 8

TABLE T1

<TABLE OF AUTHENTICATION RESULT BY AUTHENTICATION DEVICE OF EACH SEAT>

MATCHED: AUTHENTICATED, —: NOT AUTHENTICATED

| RESULT OF USER SEAT ESTIMATION | | USER | | |
|---|---|---|---|---|
| SEAT | AUTHENTICATION METHOD | A | B | C |
| DRIVER SEAT | CAMERA (FACE) AUTHENTICATION | MATCHED | MATCHED | — |
| | FINGERPRINT AUTHENTICATION | MATCHED | — | — |
| PASSENGER SEAT | CAMERA (FACE) AUTHENTICATION | MATCHED | MATCHED | — |
| | FINGERPRINT AUTHENTICATION | — | MATCHED | — |
| REAR SEAT | CAMERA (FACE) AUTHENTICATION | — | — | — |
| | FINGERPRINT AUTHENTICATION | — | — | MATCHED |

FIG. 9

TABLE T2

<TABLE OF AUTHENTICATION LEVEL>

| AUTHENTICATION METHOD | AUTHENTICATION LEVEL |
|---|---|
| CAMERA (FACE) AUTHENTICATION | 1 |
| FINGERPRINT AUTHENTICATION | 2 |
| CAMERA/FINGERPRINT AUTHENTICATION | 3 |

FIG. 10

TABLE T3

<TABLE OF AUTHENTICATION LEVEL OF EACH USER>

| | AUTHENTICATION LEVEL OF EACH USER | | |
|---|---|---|---|
| SEAT | USER A | USER B | USER C |
| DRIVER SEAT | 3 | 1 | — |
| PASSENGER SEAT | 1 | 3 | — |
| REAR SEAT | — | — | 1 |

FIG. 11

TABLE T4

<TABLE OF USER SEAT ESTIMATION>

| AUTHENTICATION LEVEL OF EACH USER | |
|---|---|
| SEAT | USER |
| DRIVER SEAT | USER A |
| PASSENGER SEAT | USER B |
| REAR SEAT | USER C |

FIG. 12

TABLE T5

<TABLE OF PERSON TO WHICH ACCESS AGREEMENT IS CONFIRMED>

| PRIVACY INFORMATION | PERSON TO WHICH ACCESS AGREEMENT IS CONFIRMED (SEAT) |
|---|---|
| CURRENT LOCATION INFORMATION | DRIVER SEAT |
| CURRENT IMAGE INFORMATION | TARGET PERSON (*1) |
| BIOMETRIC INFORMATION | TARGET PERSON (*2) |

*1: CASE OF IMAGE OF ONLY FRONT SEAT → DRIVER SEAT AND PASSENGER'S SEAT

*2: BODY TEMPERATURE OF USER IN REAR SEAT → REAR SEAT

ACCESS AUTHORIZATION SYSTEM, ELECTRONIC CONTROL DEVICE, ACCESS AUTHORIZATION METHOD, AND STORAGE MEDIUM STORING PROGRAM

CROSS REFERENCE TO RELATED APPLICATION

The present application is a continuation application of International Patent Application No. PCT/JP2023/012272 filed on Mar. 27, 2023 which designated the U.S. and claims the benefit of priority from Japanese Patent Application No. 2022-059062 filed on Mar. 31, 2022. The entire disclosures of all of the above applications are incorporated herein by reference.

TECHNICAL FIELD

The present disclosure relates to a technique of authorizing access when accessing privacy information.

BACKGROUND

In general, in a smartphone or the like, any service application is used by a user (that is, user). When privacy information (that is, personal information) of the user is required in a case where the user uses the service application, the service application accesses the privacy information. In addition, in a case where access to the privacy information is performed, agreement confirmation of access to the privacy information (that is, access agreement confirmation) is performed on the user.

SUMMARY

An access authorization system authorizes access to privacy information based on an authentication result of a user of a vehicle. Authentication of the user is performed based on the authentication result obtained by a different authentication method. The access authorization system includes a management section configured to manage, for each seat of the vehicle, management data indicating which user has been authenticated by which authentication method, and a determination section configured to determine, for access to the privacy information of the user, which user associated with each of the seats is required to make agreement based on the management data.

BRIEF DESCRIPTION OF DRAWINGS

FIG. 8 is an explanatory diagram illustrating a table T1 of an authentication result.

FIG. 9 is an explanatory diagram illustrating a table T2 of an authentication level.

FIG. 10 is an explanatory diagram illustrating a table T3 of the authentication level of each user.

FIG. 11 is an explanatory diagram illustrating a table T4 of user seat estimation.

FIG. 12 is an explanatory diagram illustrating a table T5 of a person to which access agreement is confirmed.

DETAILED DESCRIPTION

Figure 1:
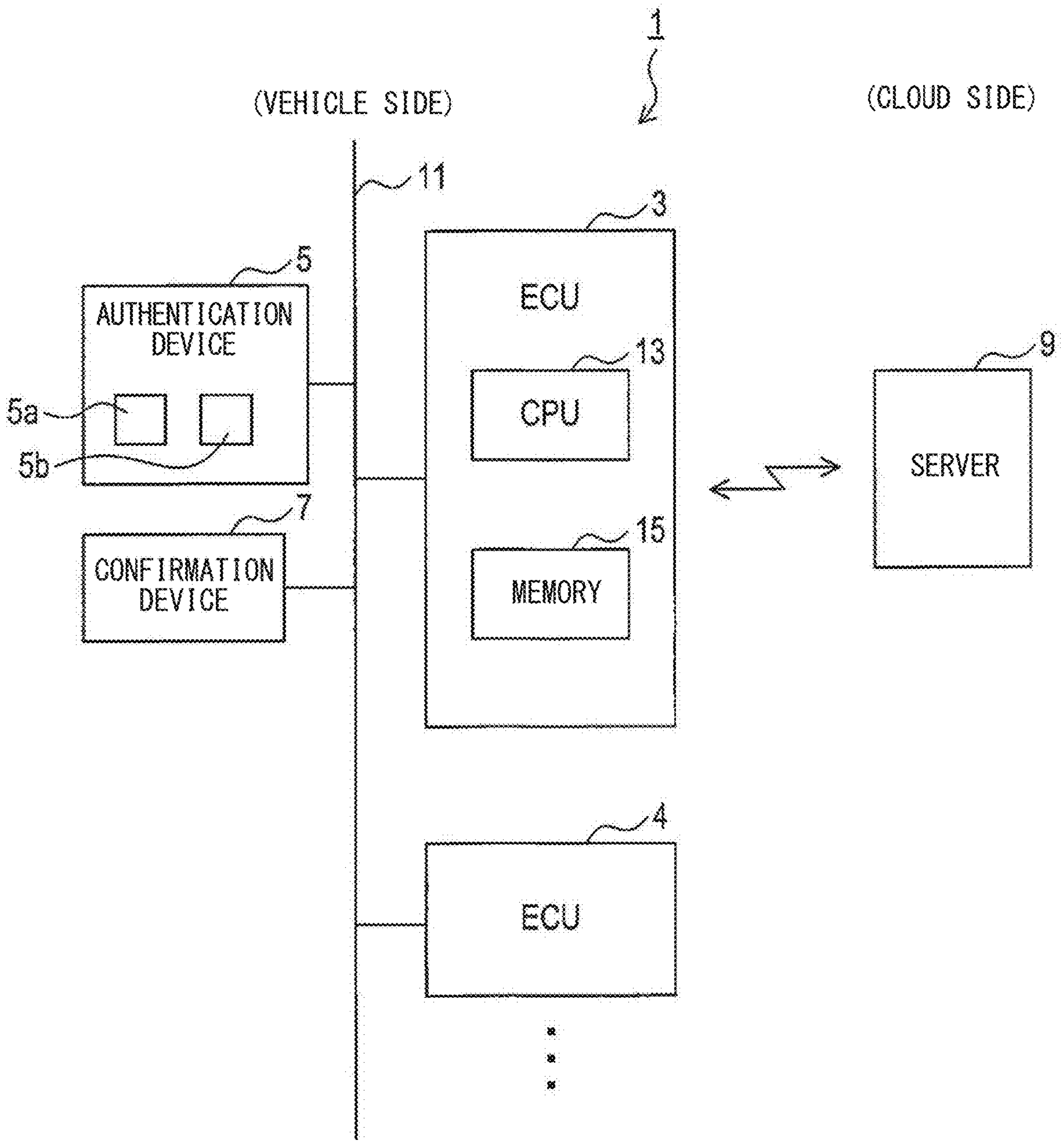
FIG. 1 is an explanatory diagram illustrating an overall configuration of a vehicle system according to an embodiment.

In the future, in order to respond to diversified needs in fields related to vehicles such as automobiles, it is expected that privacy information of a user of a vehicle included in a vehicle system is acquired by a service application installed in a vehicle or a cloud, and provision of services utilizing the privacy information is accelerated. That is, it is expected that the privacy information is increased and a situation in which access agreement confirmation related to the privacy information is performed on the user is also increased.

As a result of detailed studies by the inventors, the following problems have been found in the conventional technique.

Specifically, in a vehicle, it is assumed that a plurality of persons board the vehicle, and the plurality of persons use a service application at the same time, unlike a smartphone or the like.

Under such a situation, it is conceivable that the service application accesses privacy information of a user of the vehicle included in a vehicle system and uses the privacy information.

However, in such a case, it is conceivable that the service application confirms the access agreement to the privacy information to all the users (that is, all passengers) who use the vehicle. As a result, the burden on the user of the vehicle increases, and it takes time to confirm the access agreement, which may lead to deterioration in quality of the service application.

One aspect of the present disclosure desirably provides a technique of reducing a burden of performing agreement confirmation of access to privacy information of a user of a vehicle and suppressing deterioration in quality of a service application.

One aspect of the present disclosure relates to an access authorization system that authorizes access to privacy information based on an authentication result of a user of a vehicle.

In the access authorization system, authentication of the user is performed based on the authentication result obtained by a different authentication method.

The access authorization system includes a management section and a determination section.

The management section is configured to manage, for each seat of the vehicle, management data indicating which user has been authenticated by which authentication method.

The determination section is configured to determine, for access to the privacy information of the user, which user associated with each of the seats is required to make agreement based on the management data.

With such a configuration, in the present disclosure, it is possible to reduce a burden of performing agreement confirmation of access to privacy information of the user of the vehicle and suppressing deterioration in quality of a service application.

Specifically, in the present disclosure, the management data indicating which user is authenticated by which authentication method is managed for each seat of the vehicle. Therefore, for the access to the privacy information of the user, it is possible to determine which user associated with each seat is required to make agreement on the basis of the management data.

For this reason, agreement confirmation of access to the privacy information (that is, access agreement confirmation) can be appropriately performed on the user to which access agreement needs to be confirmed. As a result, the burden of access agreement confirmation can be reduced as compared with a case where access agreement confirmation is performed on all the users of the vehicle. In addition, since access agreement confirmation can be promptly performed on a required user, it is possible to suppress deterioration in quality of the service application.

Another aspect of the present disclosure relates to an electronic control device having a function of relaying data transmitted from a plurality of other electronic control devices mounted on a vehicle. The electronic control device includes an acquisition section and a management data storage section, a determination section and an access section.

The acquisition section is configured to acquire an authentication result of a user of the vehicle by a different authentication method.

The management data storage section is configured to store, for each seat of the vehicle, management data indicating which user has been authenticated by which authentication method.

The determination section is configured to determine, for access to privacy information of the user, which user associated with each of the seats is required to make agreement based on the management data stored in the management data storage section.

The access section is configured to access privacy information of the user stored in the electronic control device or privacy information of the user stored in the other electronic control devices.

With such a configuration, in the present disclosure, it is possible to reduce a burden of performing agreement confirmation of access to privacy information of the user of the vehicle and suppressing deterioration in quality of a service application.

Another aspect of the present disclosure relates to an access authorization method that authorizes access to privacy information based on an authentication result of a user of a vehicle.

In the access authorization method, authentication of the user is performed based on the authentication result obtained by a different authentication method.

The access authorization method performs managing, for each seat of the vehicle, management data indicating which user has been authenticated by which authentication method; and determining, for access to the privacy information of the user, which user associated with each of the seats is required to make agreement based on the management data.

With such a configuration, in the present disclosure, it is possible to reduce a burden of performing agreement confirmation of access to privacy information of the user of the vehicle and suppressing deterioration in quality of a service application.

Another aspect of the present disclosure relates to a program executed by an access authorization system that authorizes access to privacy information based on an authentication result of a user of a vehicle.

The program is configured to perform authentication of the user being performed based on the authentication result obtained by a different authentication method.

The program executes functions of managing, for each seat of the vehicle, management data indicating which user has been authenticated by which authentication method; and determining, for access to the privacy information of the user, which user associated with each of the seats is required to make agreement based on the management data.

With such a configuration, in the present disclosure, it is possible to reduce a burden of performing agreement confirmation of access to privacy information of the user of the vehicle and suppressing deterioration in quality of a service application.

Hereinafter, exemplary embodiments of the present disclosure will be described with reference to the drawings.

1. Embodiment

In the present embodiment, an access authorization system applied to a vehicle (for example, an automobile) will be described.

1-1. Overall Configuration

As illustrated in FIG. 1, in the present embodiment, a vehicle system 1 includes an electronic control device (that is, ECU) 3, an authentication device 5, and a confirmation device 7 as a vehicle-side configuration, and includes a server 9 as a cloud-side configuration. In the present embodiment, an example in which an access authorization system 23 (see, for example, FIG. 5 and the like) to be described later is installed in the ECU 3 will be described.

The ECU 3, the authentication device 5, and the confirmation device 7 are communicably connected by an in-vehicle network 11. The ECU 3 and the server 9 are wirelessly communicably connected.

The ECU 3 includes a CPU 13 which is a known arithmetic processing device, a memory 15 which is a storage device, and the like, and executes various processes (for example, process in the access authorization system 23) by executing a program stored in the memory 15, as described in detail later.

In addition to the ECU 3, another ECU 4 is also connected to the in-vehicle network 11.

Hereinafter, each configuration will be described in detail.

1-2. Authentication Device and Confirmation Device

Figure 2:
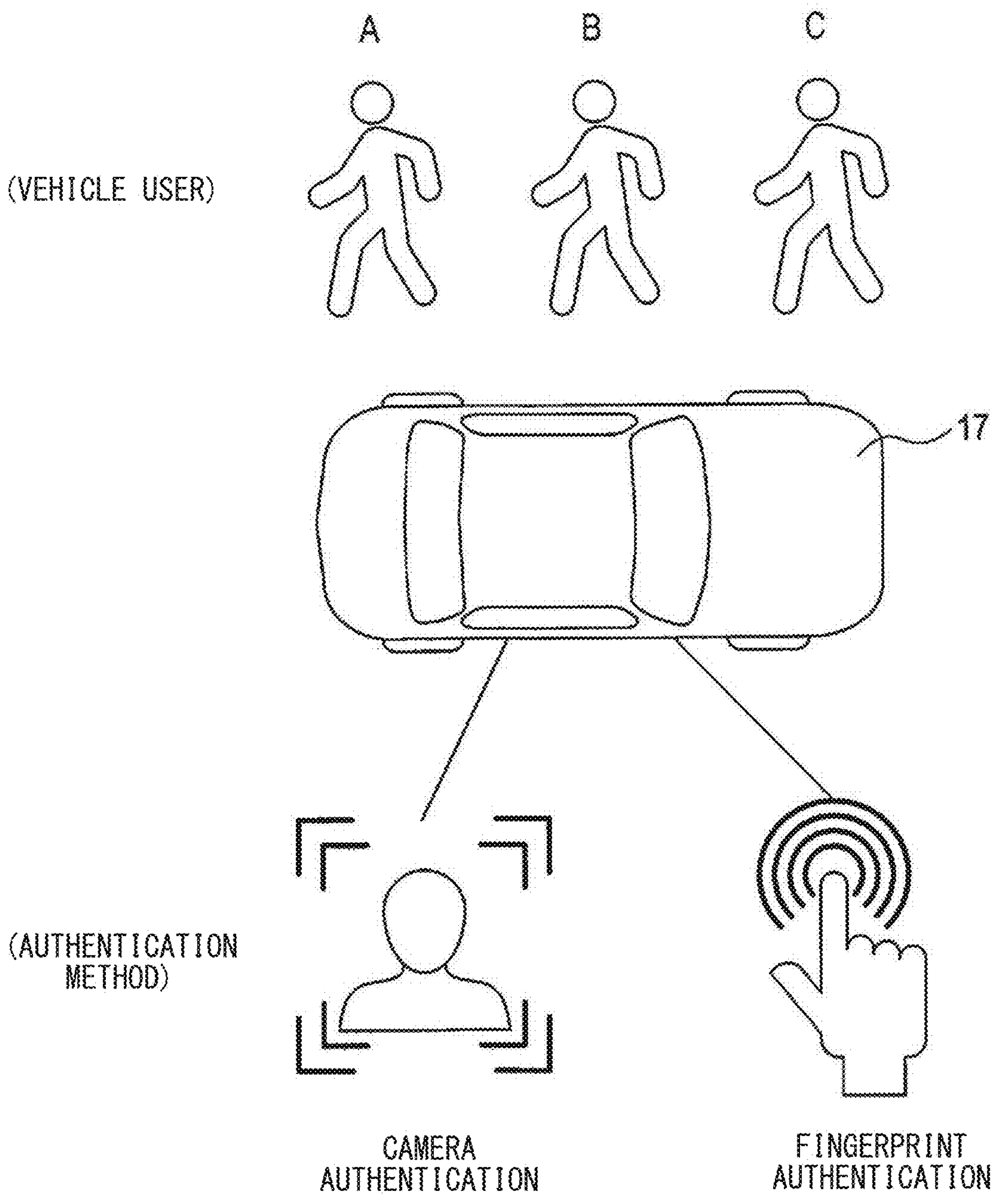
FIG. 2 is an explanatory diagram illustrating a user of a vehicle and an authentication method of the user.

In the present embodiment, as illustrated in FIG. 2, a case where users A, B, and C board a vehicle 17 will be described as an example.

(Authentication Device)

The vehicle 17 includes the authentication device 5 (see, for example, FIG. 3) that captures the face of a person (that is, user) boarding the vehicle 17 with a camera and authenticates the user on the basis of the camera image. That is, a known authentication device 5 that performs camera authentication is mounted on the vehicle.

Figure 3:
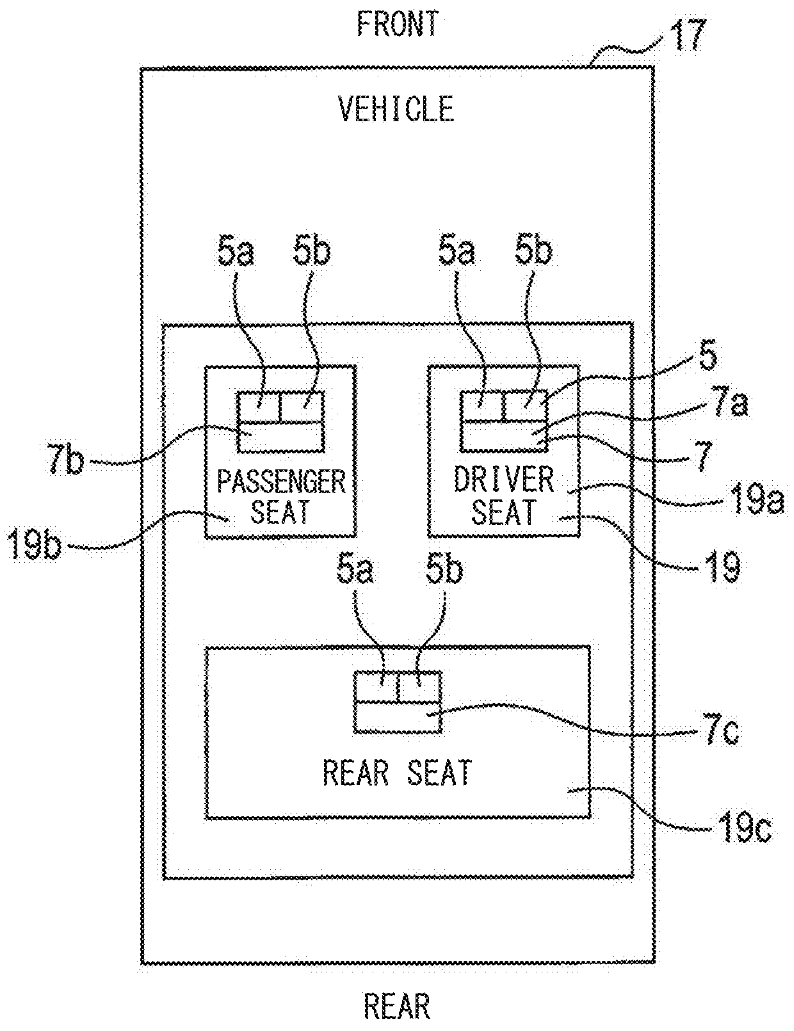
FIG. 3 is an explanatory diagram illustrating an authentication device and a confirmation device in each seat of the vehicle.

Specifically, as illustrated in FIG. 3, a camera authentication device 5*a* as the authentication device 5 is disposed in front of each seat 19 based on each seat 19 of a driver seat 19*a*, a passenger seat 19*b*, and a rear seat 19*c*, for example, in order to perform camera authentication of the user seated on each seat 19. The face image of a user who possibly boards the vehicle 17 is registered in advance in the camera authentication device 5*a*.

As another authentication device 5, a fingerprint authentication device 5*b* including a known fingerprint sensor is disposed in front of each seat 19 of the driver seat 19*a*, the passenger seat 19*b*, and the rear seat 19*c* in order to perform fingerprint authentication of the user seated on each seat 19. Fingerprint data of a user who possibly boards the vehicle 17 is registered in advance in the fingerprint authentication device 5*b*.

As the fingerprint authentication device 5*b*, it is possible to adopt a configuration including a finger confirmation portion (that is, a portion to which a finger is pressed) in which a fingerprint sensor is disposed and a display that performs display for requesting (that is, guiding) the user to perform fingerprint authentication. The guidance may be provided by voice together with display on the display, or may be provided only by voice. Then, in a case where the user's finger touches the finger confirmation portion and the fingerprint is normally read, a process for fingerprint authentication is performed.

As the rear seat 19*c*, there is usually a space where a plurality of (for example, three) users can sit, but here, an example in which one person sits on the rear seat 19*c* will be described for easy understanding of the present disclosure. That is, an example in which one camera authentication device 5*a* and one fingerprint authentication device 5*b* are arranged in the rear seat 19*c* will be described. It is needless to mention that the camera authentication device 5*a* and the fingerprint authentication device 5*b* may be arranged in front of the seat 19 of each user based on each user seated on the rear seat 19*c*. The same applies to the confirmation device 7.

In addition, a camera capable of capturing the entire vehicle cabin may be provided in front of the vehicle 17 or on the ceiling of the vehicle 17, the position of the seat 19 and the face associated with the seat 19 may be specified from a camera image, and face authentication corresponding to each seat 19 may be performed.

Here, authentication means confirming that the user is the user himself/herself, and as will be described later, the accuracy (that is, reliability) of the authentication varies depending on characteristics and performance of each authentication device 5.

(Confirmation Device)

As the confirmation device 7, an HMI in which a known display and a touch panel are combined can be adopted. HMI is an abbreviation for human machine interface.

Specifically, although not illustrated, examples of the confirmation device 7 include a configuration including a display for requesting an agreement confirmation operation, and a touch area (that is, a region where the touch panel is provided) provided on the display and capable of confirming the contact of the finger. The guidance may be performed by voice together with display, or may be performed only by voice. Then, in a case where agreement confirmation is performed by the user's finger being brought into contact with the touch area, various types of processes based on the result of the agreement confirmation are performed.

In addition, the confirmation device 7 may be a mobile phone owned by each user. In the authentication device 5, the user's mobile phone is registered in a paired state together with the user's face image and fingerprint data. The agreement confirmation may be performed by displaying a request to perform an agreement confirmation operation on the mobile phone of the user whose agreement is needed, and performing fingerprint authentication or password input on the mobile phone.

1-3. ECU

Next, the ECU 3 will be described.

As described above, the ECU 3 is an electronic control device including the CPU 13, the memory 15, and the like. That is, the ECU is a device including a known microcomputer (not illustrated). Examples of the memory 15 include known ROM 15*a* and RAM 15*b* (see, for example, FIG. 4), and an EEPROM (not illustrated). In addition, the memory 15 is not limited to a memory in the microcomputer, and may be various storage devices (for example, a hard disk or the like) outside the microcomputer.

Various functions performed by the ECU 3 are implemented by the CPU 13 executing programs stored in a non-transitory tangible recording medium. In this example, the memory 15 corresponds to a non-transitory tangible recording medium storing a program. By executing the program, the method corresponding to the program is performed.

The memory 15 stores not only various programs but also various data used when executing various programs. For example, information of the vehicle 17, information of the user (for example, privacy information which is personal information), information for performing agreement confirmation of access to privacy information (that is, access agreement confirmation), and the like, which will be described later, are stored as a database.

The method of implementing various functions of the ECU 3 is not limited to software, and some or all of the components may be implemented by using one or a plurality of pieces of hardware. For example, in a case where the function is implemented by an electronic circuit which is hardware, the electronic circuit may be implemented by a digital circuit including a large number of logic circuits, an analog circuit, or a combination thereof.

(Hardware Configuration of Vehicle)

Here, a hardware configuration of a system of the entire vehicle 17 including the ECU 3 will be described.

Figure 4:
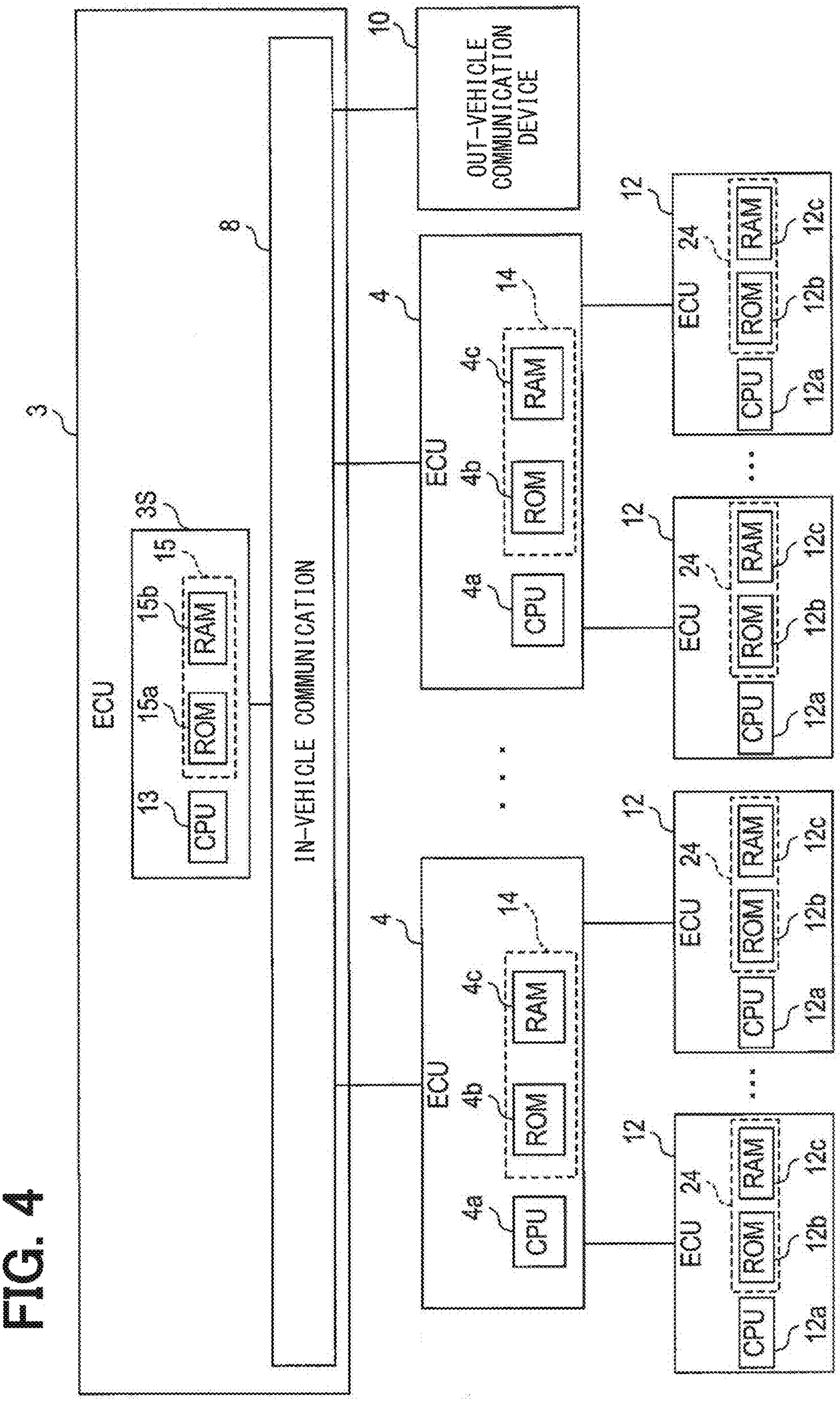
FIG. 4 is a block diagram illustrating a hardware configuration of the vehicle.

As illustrated in FIG. 4, in the vehicle 17, the ECU 3 includes the CPU 13 and the memory 15 such as the ROM 15*a* and the RAM 15*b* as a control section 3S that performs various types of arithmetic processing.

The ECU 3 is connected to a plurality of ECUs 4 and an out-vehicle communication device 10 that communicates with the outside of the vehicle by an in-vehicle communication section 8 that performs in-vehicle communication. Each ECU 4 is connected to another ECU 12.

Like the ECU 3, the ECU 4 includes a CPU 4*a* and a memory 14 such as a ROM 4*b* and a RAM 4*c*, and the ECU 12 also includes a CPU 12*a* and a memory 24 such as a ROM 12*b* and a RAM 12*c*.

The ECU 3 overall controls the plurality of ECUs 4, thereby implementing cooperative control of the entire vehicle. For example, each ECU 4 is provided for each domain divided based on the functions in the vehicle, and can mainly execute the control of the plurality of ECUs 12 present in the domain. The domain includes, for example, a powertrain, a body, a chassis, a cockpit, and the like. The ECU 12 is, for example, an ECU that controls a sensor or an actuator.

1-4. Software

Next, a configuration of software installed in the ECU 3 will be described.

Figure 5:
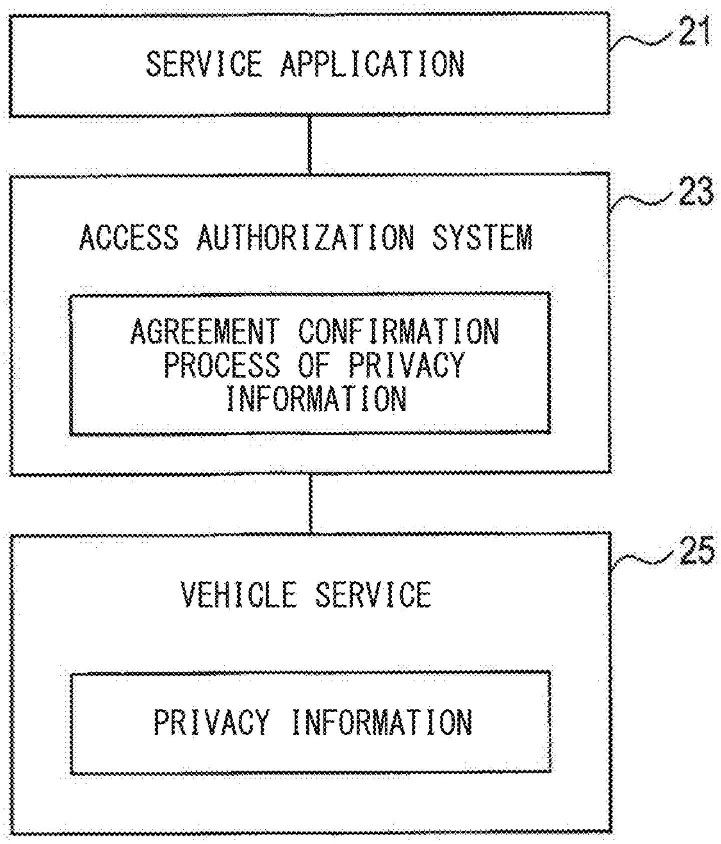
FIG. 5 is a block diagram illustrating a configuration of software and the like in the vehicle system.

As illustrated in FIG. 5, in the present embodiment, a service application 21, the access authorization system 23 (also referred to as "access authorization unit"), and a vehicle service 25 (also referred to as "vehicle service unit") are provided as a configuration of software (that is, programs to be used).

Examples of the service application 21 include a program (for example, service applications P and Q to be described later) created by a third party and installed in the vehicle 17 in advance.

The service application 21 is a program that provides a certain service to a user who is a passenger of the vehicle 17, for example, in a case where the vehicle 17 is started. For example, it is a program or the like that displays the travel history of the vehicle 17 so far to the driver or the like by a display or the like disposed on a dashboard.

Examples of the vehicle service 25 include a program (for example, vehicle services X and Y to be described later) for controlling the operation of the vehicle 17 and managing various types of information related to the vehicle 17 and the user.

Specifically, the vehicle service 25 manages various types of privacy information as personal information related to the vehicle 17 and the user. Examples of the type of privacy information include "current location information", "current image information (for example, image information of the current vehicle cabin)", and "biometric information", as described later (see, for example, FIG. 12).

The type and the like of the privacy information illustrated in FIG. 12 are stored in advance in a predetermined area of the memory 15. In addition, actual data (for example, actual data related to the current location of the vehicle 17) or the like of each type of privacy information is divided for each type of privacy information and sequentially accumulated in another area of the memory 15.

Some or all of each piece of the privacy information may be stored in the ECUs 4 and 12 different from the ECU 3 on which the vehicle service 25 is mounted. For example, the ECU 4 may be a camera ECU, and captured images may be accumulated in the memory 14 of the camera ECU.

Then, in the vehicle service 25, for example, necessary processing is performed on the basis of a request from the service application 21. For example, privacy information is accessed, or the vehicle 17 is controlled.

The access authorization system 23 has a function of connecting the service application 21 and the vehicle service 25. For example, in a case where a service request using privacy information is made from the service application 21 to the vehicle service 25, a process of performing agreement confirmation (that is, access agreement confirmation) as to whether or not to agree to the access of the privacy information is performed, as described later.

In a case where the request from the service application 21 uses information that does not correspond to the privacy information, the information is accessed without performing agreement confirmation. The access authorization system 23 determines whether or not the privacy information is used based on the type of the request from the service application 21 or the type of data requested to be accessed.

Then, in a case where the access agreement confirmation that the privacy information may be accessed is obtained, the vehicle service 25 can access the privacy information. As a result, in a case where the privacy information (for example, information of the current location of the vehicle 17, history, and the like) is obtained, the privacy information can be provided to the service application 21.

In the present embodiment, the access authorization system 23 is installed in the ECU 3. The service application 21 may be installed in the ECU 3, may be installed in another ECU 4, or may be installed on the cloud side. In addition, the vehicle service (that is, service that handles privacy information) 25 may be installed in the ECU 3 or may be installed in another ECU 4. For example, personal information such as a home address is stored in an ECU of a navigation device.

In the logical architecture of the software, middleware such as the access authorization system 23 operates on OS (that is, operating software). In addition, the service application 21 and the vehicle service 25 use services provided by middleware such as the access authorization system 23 and provide the functions.

1-5. Overview of Entire Configuration

Figure 6:
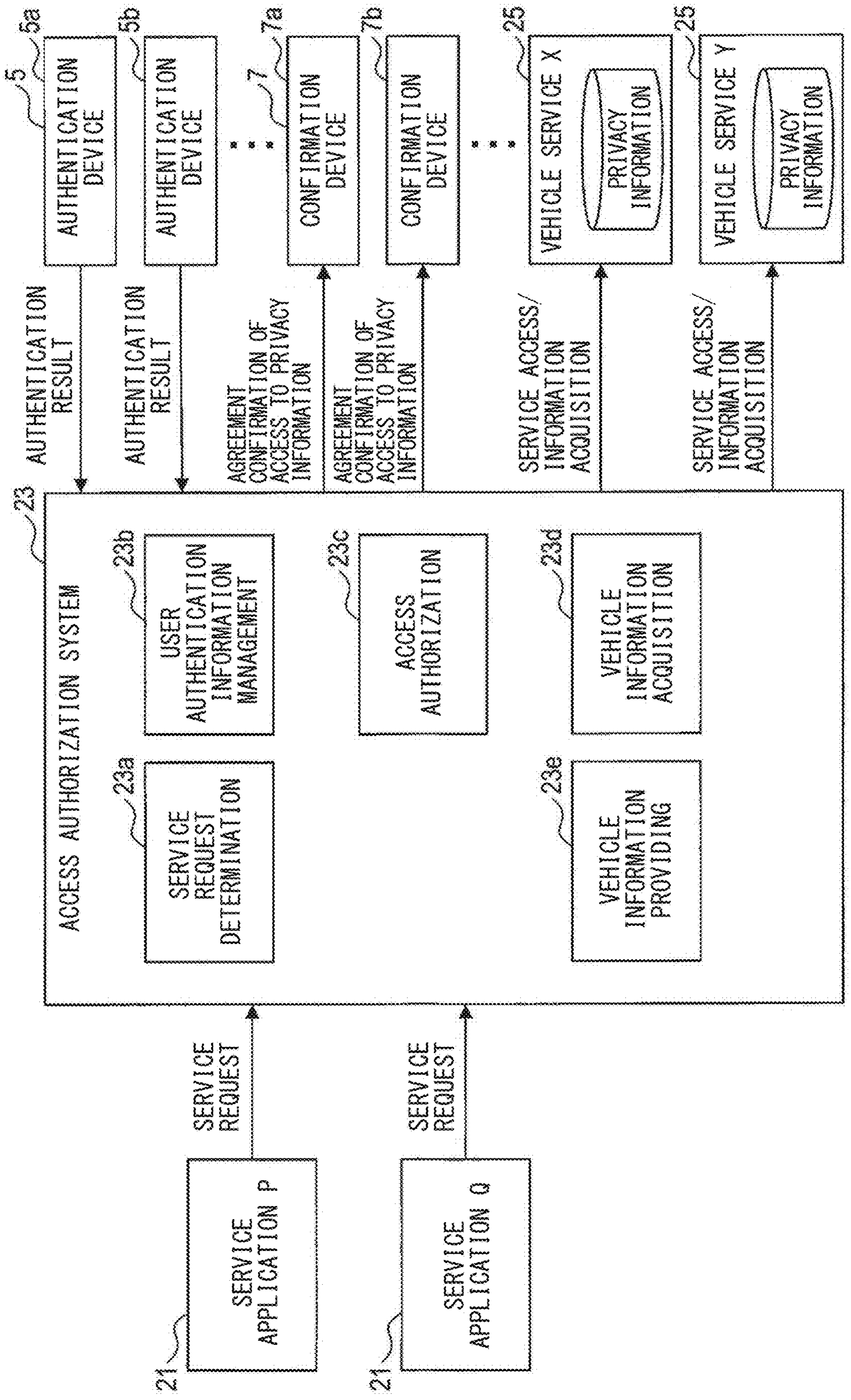
FIG. 6 is a block diagram illustrating an overall configuration of the vehicle system.

Next, the above configurations will be collectively described on the basis of the block diagram of the vehicle system 1 illustrated in FIG. 6.

(Input and Output of Access Authorization System)

As illustrated in FIG. 6, in the present embodiment, it is configured that service requests from the service application P and the service application Q described above are output to the access authorization system 23. Examples of the service request include a request to provide information necessary for implementing various services provided by each service application 21, for example, a request to provide various information (for example, privacy information) obtained from vehicle services X and Y.

In addition, it is configured that an authentication result from each authentication device 5 that authenticates each user is output to the access authorization system 23.

Various preset timings can be adopted as the timing when each authentication device 5 performs authentication, and thus, the timing when data of the authentication result (that is, management data) is updated. For example, the timing when the user gets on the vehicle, the timing when a switch for starting the vehicle 17 (for example, ignition switch) is turned on, the timing when a service request that requires authentication is made, and the like are included.

Furthermore, it is configured that a control signal for displaying access agreement confirmation or the like is output from the access authorization system 23 to the confirmation device 7 of each user on each seat 19 in order to confirm access agreement as to whether or not the user agrees to the access to the privacy information (that is, whether or not the user authorizes access).

Then, it is configured that, in a case where each user performs an access agreement confirmation operation by each confirmation device 7, a result of the access agreement confirmation is output to the access authorization system 23.

In addition, it is configured that a signal for controlling the vehicle 17 is output from the access authorization system 23 to each vehicle service 25 (that is, service access is possible).

Furthermore, it is configured that a signal for acquiring various types of information from the database of the memory 15 is output from the access authorization system 23 to each vehicle service 25 (that is, information can be acquired).

In particular, it is configured that, in a case where access agreement confirmation is performed, a signal for acquiring privacy information (for example, the current location, history, and the like of the vehicle 17) from the database of the memory 15 is output from the access authorization system 23 to each vehicle service 25. In response to this signal, the privacy information is provided from each vehicle service 25 to the access authorization system 23.

(Access Authorization System)

The access authorization system 23 functionally includes a service request determination section 23*a*, a user authentication information management section 23*b*, an access authorization section 23*c*, a vehicle information acquisition section 23*d*, and a vehicle information providing section 23*e*.

The service request determination section 23*a* is configured to determine a service request from the service application 21. For example, it is determined whether or not there is a request to provide predetermined information (for example, privacy information) from the service application 21. Then, it is configured that, in a case where it is determined that there is a service request, processes (for example, process of accessing privacy information, and the like) necessary for satisfying the service request are performed.

As will be described later, the user authentication information management section 23*b* is configured to manage various types of information necessary for determining a user (that is, person to which access agreement is confirmed) to which access agreement to privacy information needs to be confirmed, for example, information such as an authentication result by each authentication device 5 and various tables (see, for example, FIG. 7). These various tables are stored in the memory 15, for example.

The various tables are stored in the memory 14 of the ECU 4 in a case where the access authorization system 23 is present in the ECU 4, and are stored in the memory 24 of the ECU 12 in a case where the access authorization system 23 is present in the ECU 12.

The access authorization section 23*c* determines a person to which access agreement is confirmed on the basis of the information from the user authentication information management section 23*b*. In addition, control of driving the confirmation device 7 to perform access agreement confirmation is executed on the determined person to which access agreement is confirmed. Then, in a case where a signal indicating that the access agreement confirmation has been performed is obtained from the confirmation device 7, access to privacy information is authorized.

The vehicle information acquisition section 23*d* is configured to acquire necessary privacy information from a database managed by the vehicle service 25 in a case where access to privacy information is authorized.

The vehicle information acquisition section 23*d* acquires privacy information stored in the memory 15 of the ECU 3. In a case where privacy information is stored in at least one of the memories 15, 14, and 24 of the ECUs 3, 4, and 12, the privacy information is acquired from the memories 15, 14, or 24 in which the privacy information is stored.

The vehicle information providing section 23*e* is configured to provide the privacy information acquired by the vehicle information acquisition section 23*d* to the service application 21 that has made the service request.

1-6. Method of Access Agreement Confirmation

Next, a method of performing agreement confirmation of access to privacy information will be described with reference to FIGS. 7 to 12.

The access agreement confirmation means that, in a case where the service application 21 uses privacy information managed by the vehicle service 25, the service application confirms to the user whether or not the privacy information may be used.

Figure 7:
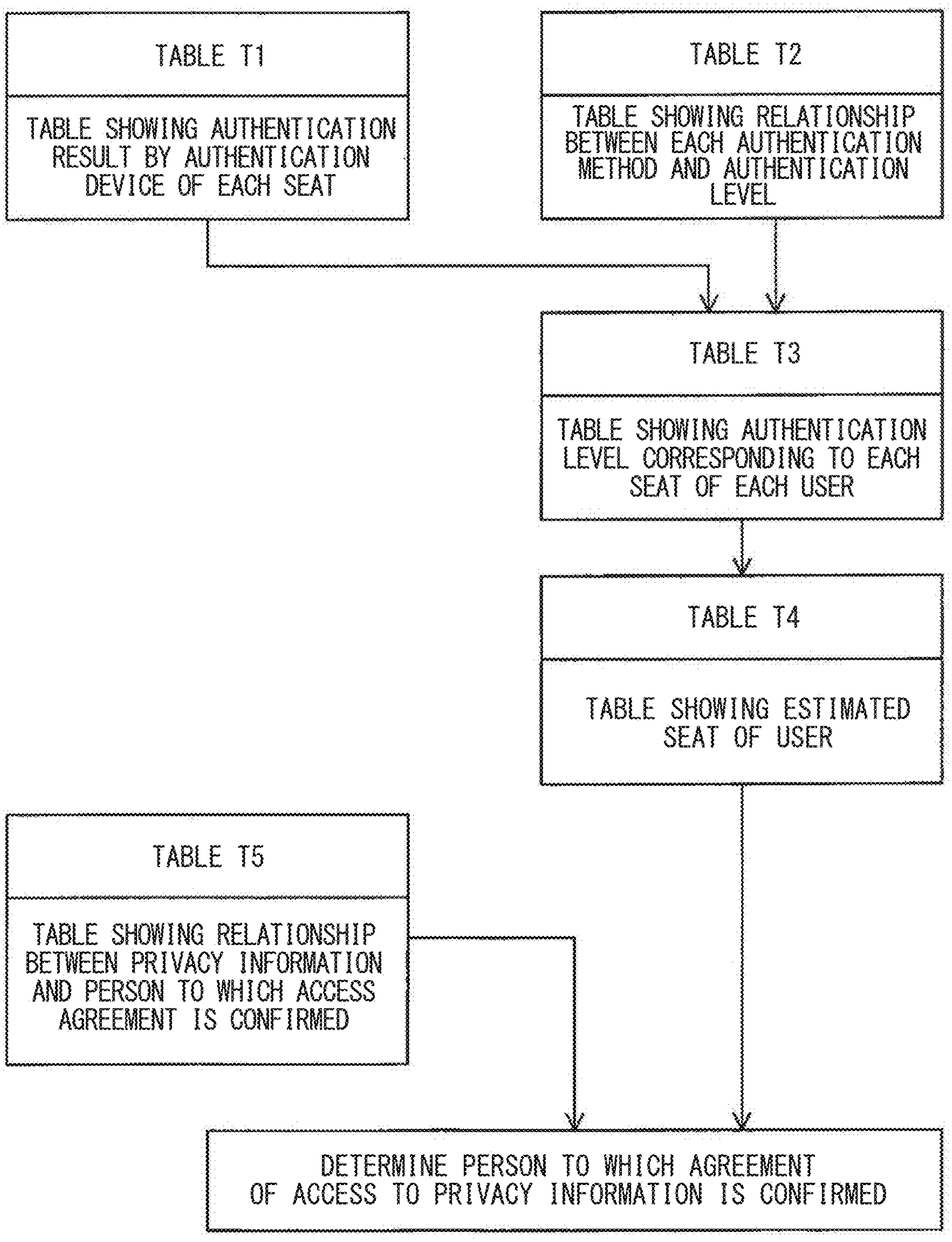
FIG. 7 is a block diagram illustrating a method of determining a person to which access agreement is confirmed.

(1) As the overall flow of access agreement confirmation is illustrated in FIG. 7, first, a table (that is, table T1) showing an authentication result by each authentication device 5 of each seat 19 is created in advance. The table T1 is stored as a database in a predetermined area of the memory 15.

Specifically, camera authentication or fingerprint authentication is performed by each authentication device 5 (that is, camera authentication device 5*a* or fingerprint authentication device 5*b*) of each seat 19, and the authentication result is stored for each user (that is, the table T1 is created). The face data and the fingerprint data of each user registered in advance in the authentication device 5 are collated with the face data obtained by capturing passengers using the authentication device 5 and the fingerprint data input using the authentication device to determine which user is seated on which seat 19.

In FIG. 8, as the authentication result, a case where authentication is performed by each authentication device 5 is indicated by “matched”, and a case where authentication is not performed is indicated by “–”.

FIG. 8 illustrates, for example, a case where a user A and a user B are authenticated by camera authentication using the camera authentication device 5*a* of the driver seat 19*a*. That is, since both the users A and B are captured by the camera authentication device 5*a* of the driver seat 19*a*, both the users A and B are authenticated by the camera images. The same applies to camera authentication by the camera authentication device 5*a* of the passenger seat 19*b*.

(2) Next, as illustrated in FIG. 7, a table T3 of the authentication level of each user is created on the basis of the authentication results in the table T1 and a table T2 of an authentication level.

As illustrated in FIG. 9, the table T2 of the authentication level is obtained by ranking the accuracy (that is, reliability) of authentication in each authentication method. That is, it is set that the fingerprint authentication has higher reliability than the camera authentication, and the highest reliability is obtained when both the camera authentication and the fingerprint authentication are performed. A larger number indicates a higher authentication level (that is, higher reliability of authentication). The table T2 is stored in the memory 15, for example.

In the table T3 of the authentication level of each user, as illustrated in FIG. 10, the authentication level of each user is determined by using the authentication result in the table T1 and the authentication level in the table T2. The table T3 is stored in the memory 15, for example.

(3) Next, as illustrated in FIG. 7, each seat 19 on which each user is highly likely to be seated is estimated on the basis of the authentication level of each user in the table T3, and a table T4 (that is, table T4 of user seat estimation) in which the seat 19 of the user is estimated, which is illustrated in FIG. 11, is created.

For example, in the table T3, for the driver seat 19*a*, the authentication level of the user A is 3, which is the maximum, and thus it is estimated that the user A is seated on the driver seat 19*a*. Similarly, for the passenger seat 19*b*, the authentication level of the user B is 3, which is the maximum, and thus it is estimated that the user B is seated on the passenger seat 19*b*. Similarly, for the rear seat 19*c*, the authentication level of a user C is 1, which is the maximum, and thus it is estimated that the user C is seated on the rear seat 19*c*.

Therefore, in the table T4, each seat 19 estimated as described above and each user estimated to be seated on each seat 19 are associated with each other. That is, each seat 19 and each user estimated to be seated on each seat 19 are associated with each other and stored in the memory 15. These tables T1 to T4 may be created in advance before an access request is received from the service application 21.

(4) Next, as illustrated in FIG. 7, the person to which access agreement is confirmed is determined on the basis of the table T4 in which the seat 19 of the user is estimated and the table T5 showing the relationship with the seat 19 of the person to which access agreement is conformed.

As illustrated in FIG. 12, the table T5 is a table showing the relationship between privacy information and the seat 19 of the person to which access agreement is confirmed (that is, user whose agreement is needed when privacy information is accessed), and is stored in the memory 15 in advance.

Specifically, for example, in a case where the privacy information that the service application 21 desires to access is the current location information of each user (therefore, the vehicle 17), the person to which access agreement is confirmed is the user seated on the driver seat 19*a* (that is, driver).

In addition, for example, in a case where the privacy information is the current image information (for example, image information of only the front seat), the persons to which access agreement is confirmed are users seated on the driver seat 19*a* and the passenger seat 19*b* (that is, target persons). In this case, it is necessary to perform agreement confirmation on both the user of the driver seat 19*a* and the user of the passenger seat 19*b*. In a case where the request from the service application 21 clearly indicates the driver seat image, it is possible to make it necessary to perform agreement confirmation on the driver seat 19*a* regardless of the table T5.

Furthermore, for example, in a case where the privacy information is biometric information (for example, the body temperature of the user of the rear seat 19*c*), the person to which access agreement is confirmed is a user seated on the rear seat 19*c* (that is, target person).

Therefore, in the present embodiment, since the user seated on each seat 19 is found from the table T4, and the seat 19 of the person to which access agreement is confirmed is found from the table T5 based on the privacy information, it is possible to find from which user seated on the seat 19 the access agreement confirmation is to be obtained based on the privacy information. That is, the person to which access agreement is confirmed based on the privacy information can be determined from the table T4 and the table T5.

For example, in a case where it is found from the table T5 that the privacy information is the current location information, it is found that the person to which access agreement is confirmed is the user of the driver seat 19*a*, and it is estimated from the table T4 that the user A is seated on the driver seat 19*a*, so that it is found that the access agreement confirmation may be performed on the user A.

Therefore, for example, the access agreement confirmation of the user A can be performed using the confirmation device 7*a* of the driver seat 19*a* on which the user A is seated.

In a case where access agreement confirmation can be performed, the access authorization system 23 can access the privacy information, and thus the privacy information (for example, information indicating the current location of the vehicle 17, and the like) stored in the database of the memory 15 can be obtained. Therefore, the acquired privacy information can be provided to the service application 21.

For example, in a case where it is desired to access a home address in a navigation device, the agreement of the vehicle owner may be obtained regardless of the seat 19. In this case, when the face data and the fingerprint data are registered in advance, the fact that the data to be registered is the data of the vehicle owner may be registered at the same time. Therefore, where the vehicle owner is seated may be determined on the basis of the registered data, and the agreement confirmation of the seat 19 (that is, the user of the seat 19) may be obtained.

1-7. Control Processing

Next, control processing performed by the ECU 3 will be described with reference to FIGS. 13 to 14.

The following processing is performed, for example, in a case where the ignition switch of the vehicle 17 is turned on.

(Seat Estimation Process)

The seat estimation process is a process of estimating which user is seated on which seat 19 of the vehicle 17.

Figure 13:
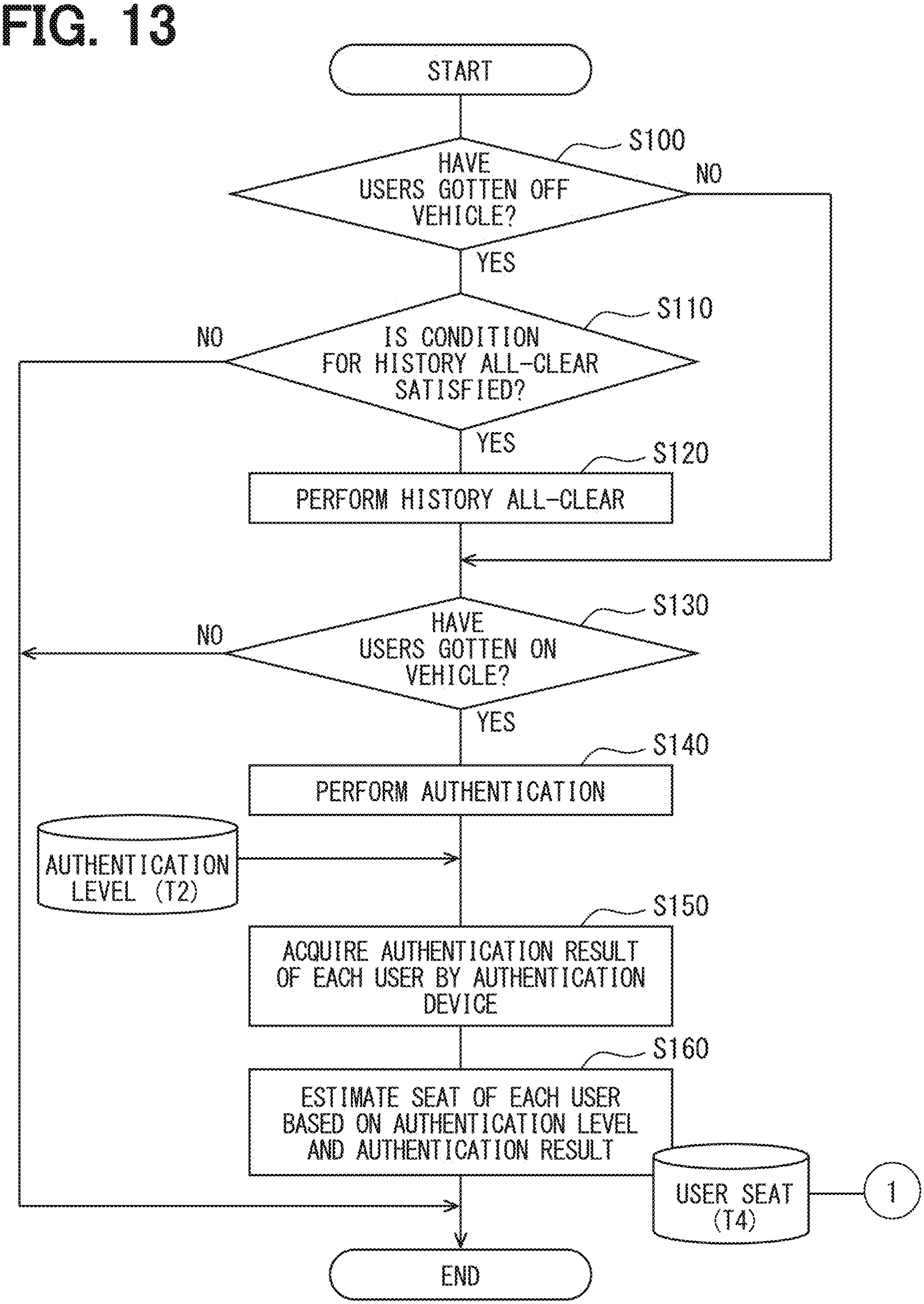
FIG. 13 is a flowchart illustrating a process of estimating a user's seat.

As illustrated in the flowchart of FIG. 13, first, in step (hereinafter, S) 100, it is determined whether or not users have gotten off the vehicle. If an affirmative determination is made, the process proceeds to S110. On the other hand, if a negative determination is made, the process proceeds to S130.

For example, in a case where it is detected by a known door switch that the doors have been opened, and thereafter, it is detected by a known seating sensor that all the seats 19 that have been in a seated state have changed to a non-seated state, it is possible to determine that the users have got off the vehicle.

In S110, it is determined whether or not a condition (that is, condition for history all-clear) for deleting the history of the information (that is, data) used to determine the person to which access agreement is confirmed is satisfied. If an affirmative determination is made, the process proceeds to S120. On the other hand, if a negative determination is made, the process is temporarily terminated.

The information used to determine the person to which access agreement is confirmed is, for example, information that varies depending on the authentication result such as the result of actually authenticating the user as in the tables T1, T3, and T4, and does not include information that does not vary depending on the authentication result (that is, information set in advance before authentication) as in the tables T2 and T5.

Furthermore, examples of the condition for history all-clear include a case where it is confirmed that use in earsharing by a certain user has ended when the vehicle 17 is shared. In a case where earsharing is ended, a signal indicating that earsharing is ended may be input to the ECU 3 of the vehicle 17 by a communication method such as the Internet, and this condition may be adopted as the condition for history all-clear. The same applies to rent-a-car, similarly to earsharing.

In addition, in the vehicle 17 owned by an individual, for example, the history may be cleared all at the time of inspection of the vehicle 17 such as at the time of vehicle inspection or after a predetermined elapsed time.

In S120, history all-clear is performed. By performing history all-clear in this manner, there is an advantage that various types of information such as privacy information are less likely to leak.

In subsequent S130, it is determined whether or not the users have gotten on the vehicle. If an affirmative determination is made, the process proceeds to S140. On the other hand, if a negative determination is made, the process is temporarily terminated.

For example, in a case where it is detected by a known door switch that the doors have been opened, and thereafter, it is detected by a known seating sensor that the non-seated state has changed to the seated state, it is possible to determine that the users have got on the vehicle.

In S140, the authentication device 5 authenticates the user. Specifically, the camera authentication device 5*a* captures the user, and the user can be authenticated from the image. In addition, for example, the fingerprint authentication device 5*b* can prompt the user to perform a fingerprint authentication operation using guidance by voice or a display.

In subsequent S150, the authentication result of each user by the authentication device 5 is acquired. As a result, for example, as illustrated in the table T1, data of the authentication result of each user corresponding to each authentication device 5 of each seat 19 is obtained by each authentication device 5. Here, in a case where the history is not cleared all in S110, since the past authentication results also remain in the table T1, the timestamp at the time of authentication is stored together with the authentication result (that is, information indicating that authentication has been performed or information indicating that authentication has not been performed).

In subsequent S160, the seat 19 of the user is estimated on the basis of the table T1 of the authentication result and the table T2 of the authentication level described above, and the process is temporarily terminated.

Specifically, the table T3 of the authentication level of each user is created using the table T1 and the table T2, and the seat 19 of the user is estimated on the basis of the table T3. In a case where the history remains in the table T1, the authentication level is determined with reference to the authentication result with a new timestamp. The table T3 may store a timestamp at the time of authentication together with the determined authentication level. When the seat 19 of the user is estimated, the authentication level with a new timestamp is referred to in the table T3. As a result, the table T4 in which the seat 19 of the user is estimated is obtained.

In this manner, it is possible to estimate which user is seated on which seat 19 of the vehicle 17.

(Access Authorization Process)

The access authorization process is a process of determining a person to which access agreement is confirmed and performing access agreement confirmation or the like.

Figure 14:
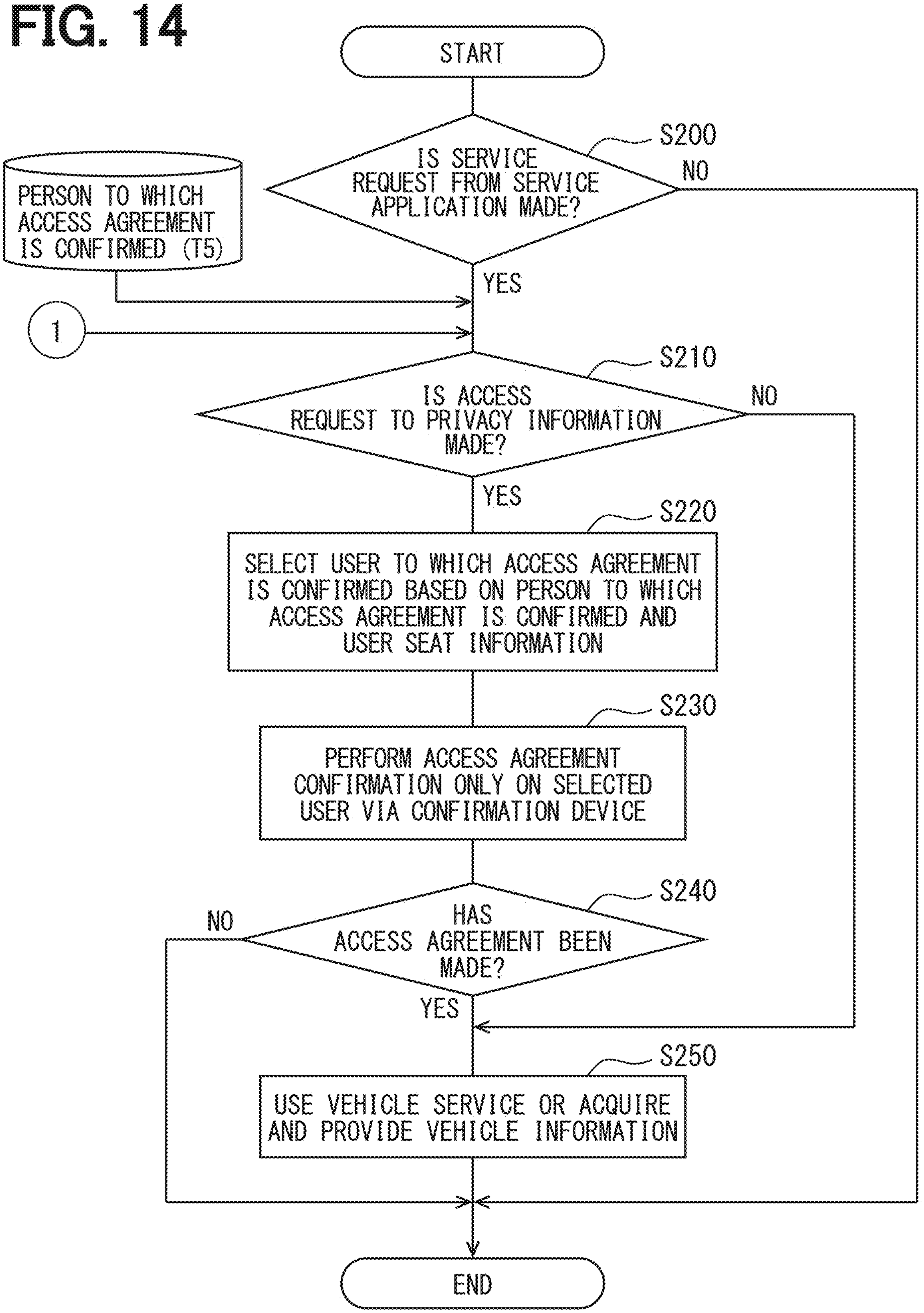
FIG. 14 is a flowchart illustrating a process such as determination of the person to which access agreement is confirmed.

As illustrated in the flowchart of FIG. 14, first, in S200, it is determined whether or not a service request from the service application 21 is made. If an affirmative determination is made, the process proceeds to S210. On the other hand, if a negative determination is made, the process is temporarily terminated. Here, examples of the service request include requesting information (for example, privacy information and various types of information other than privacy information) from the vehicle service 25.

In S210, it is determined whether or not an access request to privacy information is made. If an affirmative determination is made, the process proceeds to S220. On the other hand, if a negative determination is made, the process proceeds to S250.

In S220, since the access request to privacy information is made, the user (that is, person to which access agreement is confirmed) to which access agreement is confirmed is selected (that is, determined) on the basis of the table T5 of the person to which access agreement is confirmed and the table T4 of the user seat estimation (that is, user seat information).

In subsequent S230, access agreement confirmation is performed only on the user (that is, person to which access agreement is confirmed) selected in S220 using the confirmation device 7. For example, the confirmation device 7 prompts the user to perform an access agreement confirmation operation by using a voice or a display.

In subsequent S240, it is determined whether or not the person to which access agreement is confirmed has performed the access agreement confirmation operation on the confirmation device 7. If an affirmative determination is made, the process proceeds to S250. On the other hand, if a negative determination is made, the process is temporarily terminated. In a case where there are a plurality of persons to which access agreement is confirmed, it is regarded as an affirmative determination in a case where the access agreement of all the persons is confirmed.

In S250, since the access agreement confirmation is performed in S240, the access to privacy information is authorized, the process in response to the access request is performed, and the process is temporarily terminated.

That is, with the process, information such as privacy information can be provided from the vehicle service 25 to the service application 21.

If a negative determination is made in S210, various types of information other than the privacy information can be provided to the service application 21.

As described above, with the process, various vehicle services 25 can be used, and various types of information such as vehicle information can be acquired, provided, and the like.

1-8. Effects

According to the present embodiment, the following effects can be obtained.

(1a) In the present embodiment, data indicating which user is authenticated by which authentication method (for example, which authentication device 5) is managed for each seat 19 of the vehicle 17. Therefore, by using the data or the like for the access to the privacy information of the user, it is possible to determine which user associated with each seat 19 is required to make agreement. Specifically, by using each of the tables T1 to T5, it is possible to determine a user (that is, person to which access agreement is confirmed) to which access agreement to privacy information is needed.

Therefore, agreement confirmation of access to the privacy information (that is, access agreement confirmation) can be appropriately performed only on the person to which access agreement is confirmed. As a result, the burden of access agreement confirmation can be reduced as compared with a case where access agreement confirmation is performed on all the users of the vehicle 17. In addition, since access agreement confirmation can be promptly performed on a required user, it is possible to suppress deterioration in quality of the service application 21.

(1b) In the present embodiment, the seat 19 on which each user sits is estimated on the basis of the authentication result by each authentication method and the authentication level set based on the authentication accuracy of each authentication method. Specifically, it is configured that for each seat 19, the user with the highest authentication level is associated with the seat 19. Therefore, there is an effect that the accuracy of estimating the seat 19 is high.

(1c) In the present embodiment, it is configured that data in which the authentication result is stored is updated in a case where a predetermined data update condition is satisfied. Therefore, there is an advantage that the data can be appropriately updated.

(1d) In the present embodiment, it is configured that data used for selecting agreement confirmation is deleted in a case where a predetermined data deletion condition is satisfied. Therefore, there is an advantage that the data used for selecting agreement confirmation is appropriately protected.

1-9. Correspondence

Next, a relationship between the present embodiment and the present disclosure will be described.

The electronic control device 3, 4, 12 corresponds to an electronic control device, the vehicle 17 corresponds to a vehicle, the seat 19 corresponds to a seat, the access authorization system 23 corresponds to an access authorization system, the user authentication information management section **23*b* corresponds to a management section or an acquisition section, the access authorization section 23*c* corresponds to a determination section, the vehicle information acquisition section 23*d* corresponds to an access section, and the memory 15 and the user authentication information management section 23*b*** correspond to a management data storage section.

2. Other Embodiments

Although the embodiment of the present disclosure has been described above, it is needless to say that the present disclosure is not limited to the above embodiment and can take various forms.

(2a) In the above embodiment, the authentication device is disposed for each seat, but other configurations may be adopted. For example, one or a plurality of camera authentication devices may be arranged in the vehicle cabin, and all the passengers (that is, users) may be captured by the camera authentication devices to authenticate each user.

In addition, camera authentication or fingerprint authentication may be performed using an information terminal (for example, smartphone) carried by each user. In this case, the electronic control device (that is, ECU) of the vehicle and the information terminal communicate with each other in advance to specify the user of the information terminal. In addition, by obtaining the direction and location of the information terminal with respect to the ECU on the basis of, for example, the direction and intensity of radio waves, it is confirmed as to which information terminal is carried by the user seated on which seat (that is, the information terminal and the seat are associated with each other).

(2b) In the above embodiment, the confirmation device is disposed for each seat, but other configurations may be adopted. For example, one or a plurality of confirmation devices may be arranged in the vehicle cabin, and access agreement confirmation may be performed on all the passengers (that is, users) by the confirmation devices. In this case, it is necessary to distinguish which user performs the confirmation operation. For example, a method of providing a section for agreement confirmation divided for each user on a touch panel of a certain confirmation device can be adopted.

In addition, access agreement confirmation may be performed using an information terminal (for example, smartphone) carried by each user, as in the authentication device described above. In this case, similarly to the authentication device described above, the user of the information terminal is specified, and the information terminal is associated with the seat on the basis of the direction and location of the information terminal.

(2c) In the above embodiment, an example has been described in which the application service, the access authorization system, and the vehicle service are installed in the vehicle. However, at least one of the application service, the access authorization system, or the vehicle service may be provided in, for example, the server 9 on the cloud side other than the vehicle.

(2d) In a case where there is information indicating that a different user has been associated with the same seat in the past, agreement confirmation may be obtained from all users associated with the same seat at present and in the past when performing agreement confirmation in S230 of FIG. 14. For example, the user associated with the seat in the past can be determined with reference to the histories stored in the tables T1 and T3. For example, in a case where the service application requests access to the location information for one week, it is determined that agreement confirmation of all the users associated with the driver seat for one week is necessary.

Since there is a case where all the users are not currently on the same vehicle, in such a case, agreement confirmation of the users who are currently on the same vehicle may be obtained. In this manner, it is possible to more suitably protect the privacy information by performing agreement confirmation on all the parties concerned.

For example, in a case where the driver is replaced, it is conceivable to newly acquire data (for example, the table T1 of the authentication result) to be used for selecting agreement confirmation and newly select a person to which access agreement is confirmed based on the replacement of the driver. In this case, the previous user is different from the user this time, and these users are associated with the same driver seat. Therefore, in such a case, agreement confirmation may be performed on all the current and past users associated with the same seat. In a case where new association is performed and past data of the same seat is deleted, it is not necessary to perform such a process.

(2e) Access agreement confirmation may be performed once in response to a service request from a certain service application, or may be performed a plurality of times. For example, the access agreement confirmation may be performed in a case where the vehicle is started (for example, when the ignition switch is turned on). In addition, the access agreement confirmation may be performed in a case where a user of a certain seat changes. Alternatively, the access agreement confirmation may be performed in a case where a predetermined period has elapsed.

(2f) The control of the access authorization system and the methods described in the present disclosure may be realized by a dedicated computer provided by configuring a processor and a memory programmed to perform one or more functions embodied by a computer program.

Alternatively, the access authorization system and the method thereof described in the present disclosure may be implemented by a dedicated computer including a processor implemented by one or more dedicated hardware logic circuits.

Alternatively, the access authorization system and the method thereof described in the present disclosure may be realized by one or more dedicated computers configured by a combination of a processor and a memory programmed to execute one or more functions and a processor configured by one or more hardware logic circuits.

Furthermore, the computer program may be stored in a computer-readable non-transitory tangible storing medium as an instruction executed by a computer. The technique for realizing the functions of the respective units included in the operation control device does not necessarily need to include software, and all of the functions may be realized with the use of one or multiple hardware.

(2g) In addition to the access authorization system described above, the present disclosure may also be realized in various forms, such as a system comprising said access authorization system, a program for making a computer of the access authorization system function, a non-transitory storing medium such as semiconductor memory in which this program is recorded, a control method, etc. The disclosure may also be realized in various forms.

(2h) The multiple functions of one component in the above embodiments may be implemented by multiple components, or a function of one component may be implemented by multiple components. Further, multiple functions of multiple components may be implemented by one component, or one function implemented by multiple components may be implemented by one component. A part of the configuration of the above embodiments may be omitted as appropriate. At least a part of the configuration of the above embodiment may be added to or replaced with the configuration of another embodiment.

What is claimed is:

1. An access authorization system that authorizes access to privacy information based on an authentication result of a user of a vehicle, authentication of the user being performed based on the authentication result obtained by at least one authentication method of a plurality of authentication methods, the access authorization system comprising:

at least one of (i) a circuit and (ii) a processor with a memory storing computer program code executable by the processor, the at least one of the circuit and the processor configured to serve as:

a management section configured to manage, for each seat of the vehicle, management data indicating which user has been authenticated by which authentication method of the plurality of authentication methods and indicating whether each user of the vehicle has agreed to allow access to privacy information of the user;

a determination section configured to (i) generate seat estimation information indicating, for each seat of a plurality of seats of the vehicle, an estimated user seated in the seat based on the management data; (ii) receive a service request from a service application; and (iii) determine whether the service request requires access to privacy information of a particular user of the vehicle;

an access authorization section configured to, in response to the service request requiring access to privacy information, determine whether the particular user of the vehicle has agreed to allow access to privacy information of the particular user based on the estimated user seated in each seat of the plurality of seats of the vehicle and based on the management data; and a vehicle information providing section configured to provide the privacy information to the service application in response to the service request and in response to a determination that the particular user of the vehicle has agreed to allow access to the privacy information of the user.

2. The access authorization system according to claim 1, wherein:

the seat estimation information, for each seat of the plurality of seats of the vehicle, is generated based on the authentication result obtained by the at least one authentication method and an authentication level set based on an accuracy of authentication of each of the plurality of authentication methods.

3. The access authorization system according to claim 2, wherein:

for each seat of the plurality of seats, the estimated user is generated based on a highest authentication level associated with the seat.

4. The access authorization system according to claim 1, wherein:

in a case where different users have been associated with a same seat, agreement is obtained from each of the different users that having been associated with the seat.

5. The access authorization system according to claim 1, wherein:

the management data is updated in a case where a predetermined data update condition is satisfied.

6. The access authorization system according to claim 1, wherein:

data used to determine the particular user has agreed to allow access to privacy information of the particular user is deleted in a case where a predetermined data deletion condition is satisfied.

7. An electronic control device having a function of relaying data transmitted from a plurality of other electronic control devices mounted on a vehicle, the electronic control device comprising:

at least one of (i) a circuit and (ii) a processor with a memory storing computer program code executable by the processor, the at least one of the circuit and the processor configured to serve as:

an acquisition section configured to acquire an authentication result of a user of the vehicle based on an authentication result obtained by at least one authentication method of a plurality of authentication methods;

a management data storage section configured to store, for each seat of the vehicle, management data indicating which user has been authenticated by which authentication method of the plurality of authentication methods and indicating whether each user of the vehicle has agreed to allow access to privacy information of the user;

a determination section configured to i) generate seat estimation information indicating, for each seat of a plurality of seats of the vehicle, an estimated user seated in the seat based on the management data; (ii) receive a service request from a service application; and (iii) determine whether the service request requires access to privacy information of a particular user of the vehicle;

an access section configured to, in response to the service request requiring access to privacy information, determine whether the particular user of the vehicle has agreed to allow access to privacy information of the particular user based on the estimated user seated in each seat of the plurality of seats of the vehicle and based on the management data; and a vehicle information providing section configured to provide the privacy information to the service application in response to the service request and in response to a determination that the particular user of the vehicle has agreed to allow access to the privacy information of the user.

8. An access authorization method that authorizes access to privacy information based on an authentication result of a user of a vehicle, the access authorization method comprising:

authenticating, based on the authentication result of the user obtained by at least one authentication method of a plurality of authentication methods;

managing, for each seat of the vehicle, management data indicating which user has been authenticated by which authentication method of the plurality of authentication methods and indicating whether each user of the vehicle has agreed to allow access to privacy information of the user;

generating seat estimation information indicating, for each seat of a plurality of seats of the vehicle, an estimated user seated in the seat based on the management data;

receiving a service request from a service application;

determining whether the service request requires access to privacy information of a particular user of the vehicle;

determining, in response to the service request requiring access to privacy information, whether the particular user of the vehicle has agreed to allow access to privacy information of the particular user based on the estimated user seated in each seat of the plurality of seats of the vehicle and based on the management data; and providing the privacy information to the service application in response to the service request and in response to a determination that the particular user of the vehicle has agreed to allow access to the privacy information of the user.

9. A non-transitory computer readable storage medium storing a program executed by an access authorization system that authorizes access to privacy information based on an authentication result of a user of a vehicle, the program comprising computer-executable instructions for:

authenticating, based on the authentication result of the user obtained by at least one authentication method of a plurality of authentication methods;

managing, for each seat of the vehicle, management data indicating which user has been authenticated by which authentication method of the plurality of authentication methods and indicating whether each user of the vehicle has agreed to allow access to privacy information of the user;

generating seat estimation information indicating, for each seat of a plurality of seats of the vehicle, an estimated user seated in the seat based on the management data;

receiving a service request from a service application;

determining whether the service request requires access to privacy information of a particular user of the vehicle;

determining, in response to the service request requiring access to privacy information, whether the particular user of the vehicle has agreed to allow access to privacy information of the particular user based on the estimated user seated in each seat of the plurality of seats of the vehicle and based on the management data; and providing the privacy information to the service application in response to the service request and in response to a determination that the particular user of the vehicle has agreed to allow access to the privacy information of the user.

* * * * *